US00RE38779E

(19) United States
(12) Reissued Patent
Lovitt, Jr.

(10) Patent Number: US RE38,779 E
(45) Date of Reissued Patent: Aug. 23, 2005

(54) WHEEL AND ADAPTER

(75) Inventor: Estel L. Lovitt, Jr., Sylvania, OH (US)

(73) Assignee: Mitchell Equipment Corporation, Monclova, OH (US)

(21) Appl. No.: 10/266,136

(22) Filed: Oct. 7, 2002

Related U.S. Patent Documents

Reissue of:
(64) Patent No.: 6,238,009
Issued: May 29, 2001
Appl. No.: 09/455,190
Filed: Dec. 6, 1999

U.S. Applications:

(60) Provisional application No. 60/111,073, filed on Dec. 7, 1998.

(51) Int. Cl.[7] ..... B60B 27/00
(52) U.S. Cl. ..... 301/35.629; 301/111.01
(58) Field of Search ..... 301/9.2, 35.54, 301/35.621, 35.629, 105.1, 111.01, 111, 35.62

(56) References Cited

U.S. PATENT DOCUMENTS 1,461,229 A * 7/1923 Slaymaker
1,951,522 A * 3/1934 Nalinne
2,120,098 A * 6/1938 Hug
2,410,579 A * 11/1946 Haag
3,494,669 A * 2/1970 Reppert
3,649,079 A * 3/1972 English
3,820,851 A * 6/1974 Longo et al.
3,834,766 A * 9/1974 Thousand
4,036,530 A * 7/1977 Reppert
4,135,765 A * 1/1979 Hardwicke
4,165,904 A * 8/1979 Reppert
4,396,232 A * 8/1983 Fox
4,585,276 A * 4/1986 Tirheimer
4,699,431 A * 10/1987 Daberkoe
4,944,562 A * 7/1990 Garrison
D359,021 S * 6/1995 Snook
5,785,391 A * 7/1998 Parry et al.

* cited by examiner

*Primary Examiner*—Russell D. Stormer
(74) *Attorney, Agent, or Firm*—Fraser Martin Buchanan Miller LLC; Donald R. Fraser

(57) ABSTRACT

A wheel adapter that adapts a conventional vehicle hub to a wheel having a large inward offset, thereby permitting the original wheel track of the vehicle to be changed to match the width of a railroad track so the tires of the vehicle will sit on the railroad track. The adapter locates the wheel to avoid contact with a brake caliper on the vehicle.

7 Claims, 2 Drawing Sheets

WHEEL AND ADAPTER

Matter enclosed in heavy brackets [ ] appears in the original patent but forms no part of this reissue specification; matter printed in italics indicates the additions made by reissue.

This is a continuation of provisional patent application Ser. No. 60/111,073, filed Dec. 7, 1998.

FIELD OF THE INVENTION

The present invention relates to mounting wheels on vehicles, and more particularly to a wheel and adapter that effectively decreases the distance between tires of the vehicle to facilitate the use of the vehicle on a railroad track.

BACKGROUND OF THE INVENTION

The concept of using a wheel adapter is not new. A typical purpose of a wheel adapter is to install a wheel that is different from the original equipment manufacturer's wheel. Wheel adapters may be used: to install a wheel that has a different bolt pattern; to install a wheel that has a different tire size; to install a wheel to increase the tire track (center to center of tire); and to convert a single rear wheel to a dual rear wheel.

In each of the above uses the final position of the wheel and associated tire is moved outwardly of the original position. In situation where the opposite effect is desired, the reduction in the distance between the wheel and associated tire sets typically has an undesirable affect on riding and handling characteristics of the vehicle. When the wheel and tire sets of the front end suspension are moved inwardly, the turning radius of the vehicle is restricted due to interference between the tire and the frame and/or the brake calipers. In certain vehicles, it is required that the tire track be reduced to allow the tires of the vehicle to be properly positioned on a railroad track.

For a railroad application, the tire size is typically increased from 16-inches to 19.5 inches, which is the maximum size allowable to ensure for adequate clearances. The normal offset of the 16-inch wheel is 0.50 inches. To allow the tire to ride on railroad track, a special wheel is required that has enough clearance to clear a brake caliper or use a deep offset rim such as for example, a 5-inch offset, and use an adapter to bring the rim to the final desired position.

Heretofore, a means has not been available to produce a wheel of different size that will allow a single rear wheel truck such as a one-half-ton, three-quarter-ton, or single rear wheel one ton truck that will interchange with the given wheel mounted on a wheel hub and allow the tire to be positioned on railroad track. Thus, there is a need for such a wheel adapter.

An object of the present invention is to produce a wheel adapter which provides the option of mounting a wheel of different size and wheel track than the wheel originally supplied on the wheel hub.

Another object of the present invention is to produce a wheel adapter that minimizes the length of the wheel mounting stud which thereby minimizes the thickness of the adapter allowing the adapted wheel to be moved inward so the tire will sit on the railroad rail.

Still another object of the present invention is to produce a wheel adapter, which allows the adapter to be mounted to a hub that has various bolt circles, various number of mounting studs and various size mounting studs.

SUMMARY OF THE INVENTION

The above, as well as other objects of the invention, may be readily achieved by a wheel and adapter for mounting a wheel on a vehicle having an annular array of spaced apart wheel mounting studs on a wheel hub with a pilot, comprising: an annular rim having spaced apart marginal edges, the edges lying in spaced apart parallel planes; a web having a first end integral with the rim and a second end terminating in a centrally disposed aperture in a plane parallel with the planes of the edges of the rim and spaced outwardly from one of the planes, the second end of the web having an annular array of spaced apart stud receiving holes formed therein; an adapter plate having an annular array of spaced apart holes therethrough, the holes through the adapter plate being adapted to respectively receive the wheel mounting studs, the adapter plate having a central aperture formed by an inner surface of the adapter, the inner surface of the adapter providing a bearing surface for the wheel hub pilot; a plurality of studs protruding from the adapter plate and arranged so as to extend respectively through the stud receiving holes in the web; and a raised circular pilot protruding outwardly from the adapter plate substantially parallel to the studs and extending radially outwardly from the aperture of the adapter plate, the pilot providing a bearing surface for the second end of the web.

BRIEF DESCRIPTION OF THE DRAWINGS

The above, as well as other objects, features, and advantages of the present invention will be understood from the detailed description of the preferred embodiments of the present invention when considered in the light of the accompanying drawings, in which.

DETAILED DESCRIPTION OF THE ILLUSTRATED EMBODIMENT

Figure 1:
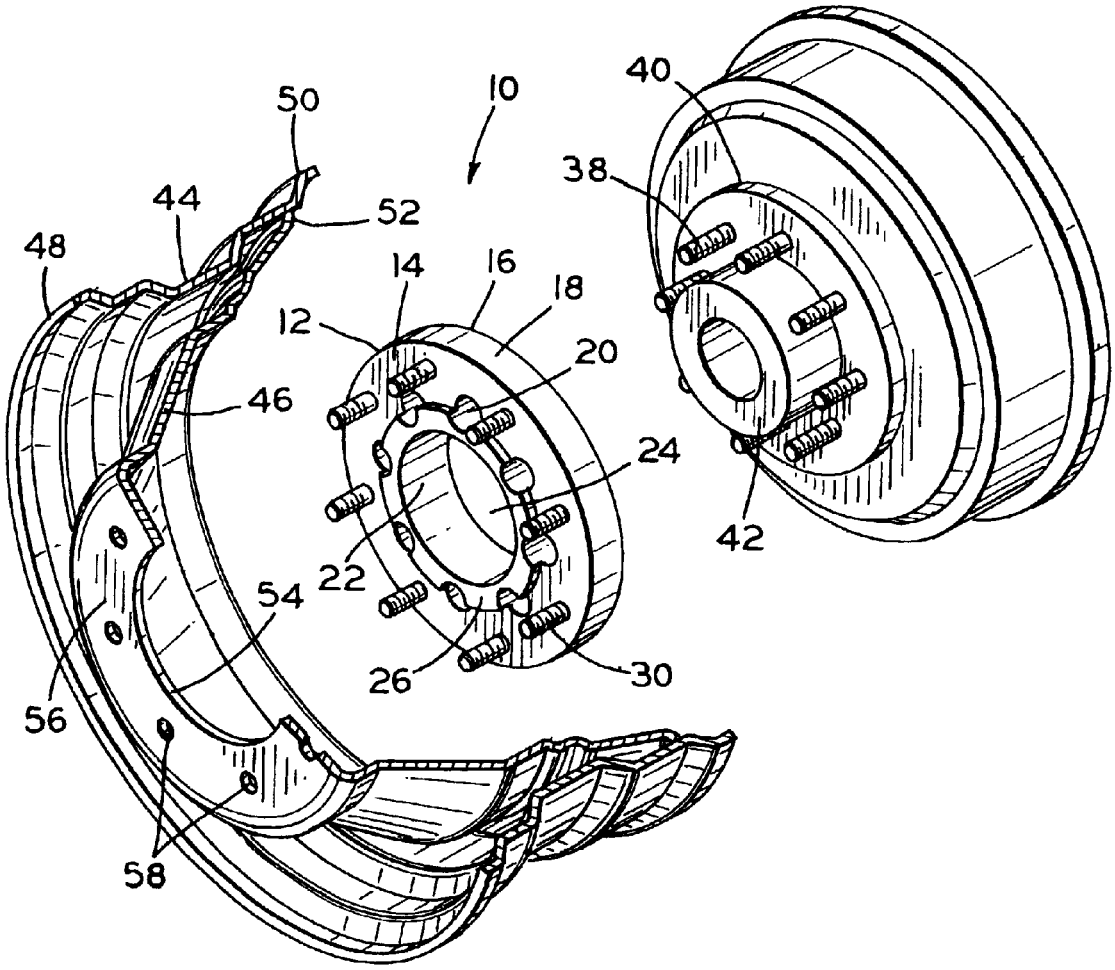
FIG. 1 is an exploded partially cut-away view of the wheel adapter system including a rim, a hub, and an adapter of the present invention.

Referring now to the drawings, and particularly to FIG. 1, there is shown generally at 10 a wheel adapter. The wheel adapter 10 includes an annular adapter plate 12. The adapter plate 12 has two flat surfaces 14, 16 and a curved outer peripheral edge 18. A plurality of holes 20 are formed in the adapter plate 12 and extend from one surface 14 to the other surface 16. The holes 20 are equally spaced apart from each other and form an annular array.

Figure 2:
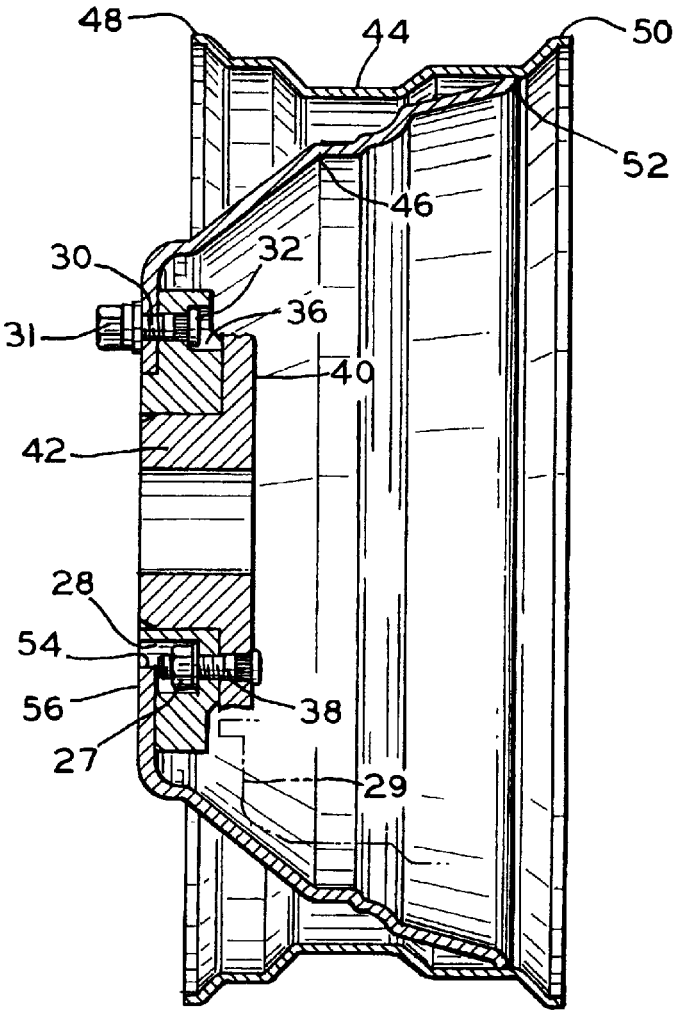
FIG. 2 is a sectional view of the wheel adapter system illustrated in FIG. 1 in an assembled form.

The adapter plate 12 has an annular inner surface 22 that defines a centrally disposed aperture 24. A raised circular pilot 26 is disposed radially outward from the inner surface 22 on one surface 14 of the adapter plate 12. The pilot 26 is in coaxial alignment with the aperture 24 of the adapter plate 12. A portion of each of the holes 20 is formed through the pilot 26 to permit a lug nut 27 to freely pass to rest against a countersunk portion 28 of the hole as illustrated in FIG. 2. The flat surface 16 of the adapter plate 12 is contoured to clear a brake caliper 29 illustrated in phantom in FIG. 3.

Figure 3:
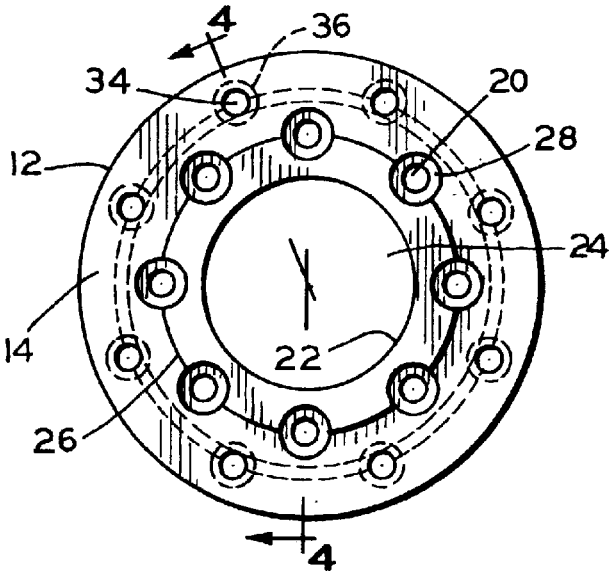
FIG. 3 is a left hand elevational view of the hub and adapter illustrated in FIG. 2.
Figure 4:
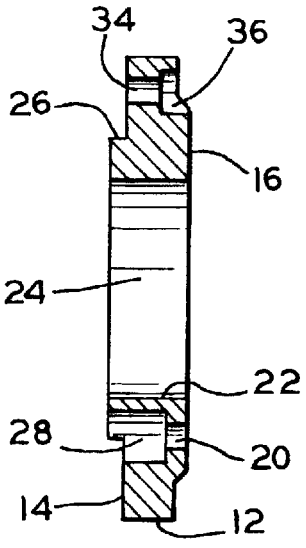
FIG. 4 is a sectional view taken along line 4—4 of FIG. 3

A plurality of studs 30 protrude from the adapter plate 12. Each of the studs 30 has a threaded outer surface for receiving a lug nut 31 as illustrated in FIG. 2. One end of each of the studs 30 has a head 32 disposed on one end. The embodiment illustrated in FIGS. 2 and 3 shows a hole 34 with a countersunk portion 36, through which the stud 30 is inserted. The head 32 is disposed in the countersunk portion 36, which restricts the axial movement of the stud 30.

An annular array of spaced apart studs 38 extend outwardly from a wheel hub 40. Each of the studs 38 has a threaded outer surface for receiving the lug nut 27 as illustrated in FIG. 2. A pilot 42 is disposed on the wheel hub 40 concentric with and radially inward of the studs 38. The pilot 42 protrudes outwardly from the wheel hub 40 parallel to the studs 38.

A wheel assembly is formed to include an annular rim 44 and an associated web 46. The rim 44 terminates in spaced apart edges 48, 50 which cooperate with the beads of a tire (not shown) to create an air tight seal between the rim 44 and an associated tire. The web 46 has a first edge 52 that is attached and integral with the rim 44 near edge 50. The web 46 extends in a substantially frusta conical shape and terminates at a second edge 54 that forms a centrally disposed aperture. The aperture formed by the second edge 54 of the web 46 lies in a plane which is parallel to a plane in which the edge 48 of the rim 44 lies in. A flat annular portion 56 is formed near the second edge 54 of the web 46. An annular array of spaced apart holes 58 is formed in the flat annular portion 56 of the web 46.

The holes 20 of the adapter plate 12 are arranged to receive the studs 38 of the wheel hub 40. At the same time, the pilot 42 is received within the aperture 24 of the adapter plate 12. The inner surface 22 of the adapter plate 12 provides a bearing surface for the pilot 42 to prevent all of the weight of the associated vehicle (not shown) to be carried solely by the studs 38. Once the studs 38 have been inserted into the holes 20, the lug nut 27 is tightened on the stud 38 to fixedly attach the adapter plate 12 to the wheel hub 40.

The holes 58 of the web 46 are arranged to receive the studs 30 of the adapter plate 12. At the same time, the pilot 26 of the adapter plate 12 is received within the aperture formed by the second edge 54 of the web 46. The pilot 26 of the adapter plate 12 provides a bearing surface for the second edge 54 of the web 46 to prevent all of the weight of the associated vehicle to be carried solely by the studs 30. Once the studs 30 have been inserted into the holes 58, the lug nut 31 is tightened on the stud 28 to fixedly attach the wheel assembly to the adapter plate 12.

The purpose of the invention is to attach and pilot a slightly larger truck rim on a truck hub such that the position would enable the truck tire to be positioned on an associated rail. Further, to accomplish the objective, the normal wheel receiving studs 38 must be shortened so that they cannot pass to contact the web 46 of the rim 44. The studs 38 are just long enough to be secured through the adapter plate 12 and receive a fastening lug nut 27.

In accordance with the provision of the patent statutes, the present invention has been described in what is considered to represent its preferred embodiment. However, it should be understood that the invention can be practiced otherwise than as specifically illustrated and described without departing from its spirit or scope.

What is claimed is:

1. A wheel and adapter for mounting a wheel on a vehicle having an annular array of spaced apart wheel mounting studs on a wheel hub with a pilot, comprising:

an annular rim having spaced apart marginal edges, the edges lying in spaced apart parallel *planes;*

*a web having a first end integral with said rim and a second end terminating in a centrally disposed aperture in a plane parallel* with the planes of the edges of said rim and spaced outwardly from one of the planes, the second end of said web having an annular array of spaced apart stud receiving holes formed therein;

an adapter plate having an annular array of spaced apart holes therethrough, the holes through said adapter plate being adapted to respectively receive the wheel mounting studs, said adapter plate having a central aperture formed by an inner surface of said adapter, the inner surface of said adapter providing a bearing surface for the wheel hub pilot, said adapter plate having a first and a second spaced apart surface;

a plurality of studs protruding from said adapter plate and arranged so as to extend respectively through the stud receiving holes in said web;

a raised circular pilot protruding outwardly from the first surface of said adapter plate substantially parallel to said studs and extending radially outwardly from the aperture of said adapter plate, said pilot providing a bearing surface for the second end and said web; and a raised annular surface protruding from the second surface of said adapter plate and extending radially outwardly from the aperture of said adapter plate.

2. The wheel and adapter defined in claim 1 wherein the wheel mounting studs of the wheel hub are of a length whereby contact with the web of said rim is avoided.

3. The wheel and adapter defined in claim 1 wherein said studs are threaded.

4. The wheel and adapter defined in claim 3 wherein said rim and said adapter plate are fixedly attached by a plurality of lug nuts fastened to said studs.

5. The wheel and adapter defined in claim 1 wherein there are eight of said studs.

6. The wheel and adapter defined in claim 1 wherein there are eight holes in said adapter plate.

7. The wheel and adapter defined in claim 1 wherein a third plane as equidistant from each of the planes of said rim whereby the second end of the web of said rim terminates at least five inches from the third plane of said rim.

* * * * *